(12) United States Patent
Choi et al.

(10) Patent No.: US 10,877,312 B2
(45) Date of Patent: Dec. 29, 2020

(54) REFLECTION SYSTEM

(71) Applicant: SAMSUNG ELECTRONICS CO., LTD., Suwon-si (KR)

(72) Inventors: Yoonsun Choi, Yongin-si (KR); Dong Kyun Nam, Yongin-si (KR); Jinho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/421,806

(22) Filed: May 24, 2019

(65) Prior Publication Data
US 2020/0192156 A1   Jun. 18, 2020

(30) Foreign Application Priority Data
Dec. 14, 2018   (KR) .......................... 10-2018-0162215

(51) Int. Cl.
| | | |
|---|---|---|
| *G02F 1/1335* | (2006.01) | |
| *G02B 27/01* | (2006.01) | |
| *G02F 1/1337* | (2006.01) | |
| *G02F 1/1343* | (2006.01) | |

(52) U.S. Cl.
CPC ... *G02F 1/133553* (2013.01); *G02B 27/0101* (2013.01); *G02F 1/1337* (2013.01); *G02F 1/1343* (2013.01)

(58) Field of Classification Search
CPC ............. G02F 1/133553; G02F 1/1337; G02F 1/1343; G02B 27/0101
See application file for complete search history.

(56) References Cited

U.S. PATENT DOCUMENTS

| | | | |
|---|---|---|---|
| 7,886,871 B2 | 2/2011 | Miyai | |
| 2010/0314900 A1 | 12/2010 | Labrot et al. | |
| 2014/0226096 A1* | 8/2014 | Taheri | G02F 1/13306 349/33 |
| 2016/0216553 A1 | 7/2016 | Otani | |

(Continued)

FOREIGN PATENT DOCUMENTS

| | | |
|---|---|---|
| EP | 1 395 867 B1 | 11/2014 |
| KR | 10-0813493 B1 | 3/2008 |
| KR | 10-2012-0096437 A | 8/2012 |

OTHER PUBLICATIONS

Chen, C., et al., "Improved Viewing Zones for Projection Type Integral Imaging 3D Display Using Adaptive Liquid Crystal Prism Array", Mar. 2014, Journal of Display Technology, vol. 10, No. 3, pp. 198-203, 6 pages total.

*Primary Examiner* — Nathanael R Briggs
(74) *Attorney, Agent, or Firm* — Sughrue Mion, PLLC

(57) ABSTRACT

Provided is a reflection system including a windshield and a feeder. The windshield includes an upper transparent layer, an upper electrode, a liquid crystal layer, a lower electrode array, and a lower transparent layer, and the feeder is configured to apply a voltage pattern to the lower electrode array. A refractive index of the liquid crystal layer varies across the liquid crystal layer according to the voltage pattern applied by the feeder to the lower electrode array, and the feeder is configured to apply a first voltage pattern to cause a first change in the refractive index of the liquid crystal layer such that parallel light rays incident to the windshield and reflected from the upper transparent layer and the lower transparent layer, respectively, meet at a virtual focal point.

12 Claims, 7 Drawing Sheets

(56) References Cited

U.S. PATENT DOCUMENTS

2016/0291324 A1  10/2016  Arndt et al.
2017/0285339 A1* 10/2017  Spangler ........... B32B 17/10788
2017/0315410 A1  11/2017  Oosawa
2018/0312111 A1* 11/2018  Bongwald ................. B60R 1/00

* cited by examiner

REFLECTION SYSTEM

CROSS-REFERENCE TO RELATED APPLICATION

This application claims priority under 35 U.S.C. § 119 to Korean Patent Application No. 10-2018-0162215, filed on Dec. 14, 2018 in the Korean Intellectual Property Office, the disclosure of which is incorporated herein by reference in its entirety.

BACKGROUND

1. Field

Methods and apparatuses consistent with example embodiments relate to a reflection system that may reflect an image projected by a head-up display (HUD). More particularly, example embodiments relate to enhancing the quality of an image that is reflected by a windshield.

2. Description of the Related Art

A head-up display (HUD) method displays an image at a position that corresponds to a viewpoint of a user that is driving a vehicle. In other words, The HUD method displays an image in a direction in which the user may typically be looking while driving the vehicle. The HUD method differs from a head-down display (HDD) method that displays the image at a position below the viewpoint of the user. The HUD method may enhance convenience and safety of the driver by minimizing a change in a gaze of the driver. To further enhance the convenience and safety of the driver, there is a need to enhance the quality of an image displayed by the HUD method.

SUMMARY

Example embodiments may address at least the above problems and/or disadvantages and other disadvantages not described above. Also, example embodiments are not required to overcome the disadvantages described above, and an example embodiment may not overcome any of the problems described above.

According to an aspect of the disclosure, a reflection system includes a windshield comprising an upper transparent layer, an upper electrode, a liquid crystal layer, a lower electrode array, and a lower transparent layer; and a feeder configured to apply a voltage pattern to the lower electrode array, wherein a refractive index of the liquid crystal layer varies across the liquid crystal layer according to the voltage pattern applied by the feeder to the lower electrode array, and wherein the feeder is configured to apply a first voltage pattern to cause a first change in the refractive index of the liquid crystal layer such that parallel light rays incident to the windshield and reflected from the upper transparent layer and the lower transparent layer, respectively, meet at a virtual focal point.

The liquid crystal layer may include a plurality of regions, each region from among the plurality of regions corresponding to a plurality of lower electrode cells, and the first voltage pattern applied by the feeder may cause a refractive index of each region from among the plurality of regions to continuously vary across the region.

Each region from among the plurality of regions having the first voltage pattern applied by the feeder may include a microprism.

The lower electrode array may include a first lower electrode cell and a second lower electrode cell adjacent to the first lower electrode cell, the liquid crystal layer may include a first region corresponding to the first lower electrode cell and a second region corresponding to the second lower electrode cell, and a first refractive index of the first region and a second refractive index of the second region may continuously vary in response to the feeder applying the first voltage pattern to the first lower electrode cell and the second lower electrode cell.

The first lower electrode cell may include a first electrode and a second electrode, the second lower electrode cell may include a third electrode and a fourth electrode, a low voltage may be applied to the first lower electrode of the first lower electrode cell and the third lower electrode of the second lower electrode cell, and a high voltage may be applied to the second lower electrode of the first lower electrode cell and the fourth lower electrode of the second lower electrode cell.

The feeder may be configured to apply a second voltage pattern to cause a second change in the refractive index of the liquid crystal layer such that a transmittance of the windshield decreases.

According to an aspect of the disclosure, a reflection system a windshield includes an upper transparent layer, an upper electrode, a liquid crystal layer, a lower electrode array, and a lower transparent layer; and a feeder configured to apply a voltage pattern to the lower electrode array, wherein the upper transparent layer and the lower transparent layer form a wedge angle, wherein a refractive index of the liquid crystal layer varies across the liquid crystal layer according to the voltage pattern applied by the feeder to the lower electrode array, wherein, in response to the feeder not applying any voltage pattern, paths of parallel light rays incident to the windshield and reflected from the upper transparent layer and the lower transparent layer, respectively, meet at a first virtual focal point, and wherein, in response to the feeder applying a first voltage pattern, the paths of the parallel light rays incident to the windshield and reflected from the upper transparent layer and the lower transparent layer, respectively, meet at a second virtual focal point.

The liquid crystal layer may include a plurality of regions, each region from among the plurality of regions corresponding to a plurality of lower electrode cells, and the first voltage pattern applied by the feeder may cause a refractive index of each region from among the plurality of regions to continuously vary across the region.

Each region from among the plurality of regions having the first voltage pattern applied by the feeder may include a microprism.

The lower electrode array may include a first lower electrode cell and a second lower electrode cell adjacent to the first lower electrode cell, the liquid crystal layer may include a first region corresponding to the first lower electrode cell and a second region corresponding to the second lower electrode cell, and a first refractive index of the first region and a second refractive index of the second region may change in response to the feeder applying the first voltage pattern to the first lower electrode cell and the second lower electrode cell.

The first lower electrode cell may include a first electrode and a second electrode, the second lower electrode cell may include a third electrode and a fourth electrode, a low voltage may be applied to the first lower electrode of the first lower electrode cell and the third lower electrode of the second lower electrode cell, and a high voltage may be applied to the second lower electrode of the first lower electrode cell and the fourth lower electrode of the second lower electrode cell.

The feeder may be configured to apply a second voltage pattern to cause a second change in the refractive index of the liquid crystal layer such that a transmittance of the windshield decreases.

BRIEF DESCRIPTION OF THE DRAWINGS

The above and/or other aspects will be more apparent from the following description with reference to the accompanying drawings, in which.

DETAILED DESCRIPTION

Figure 1:
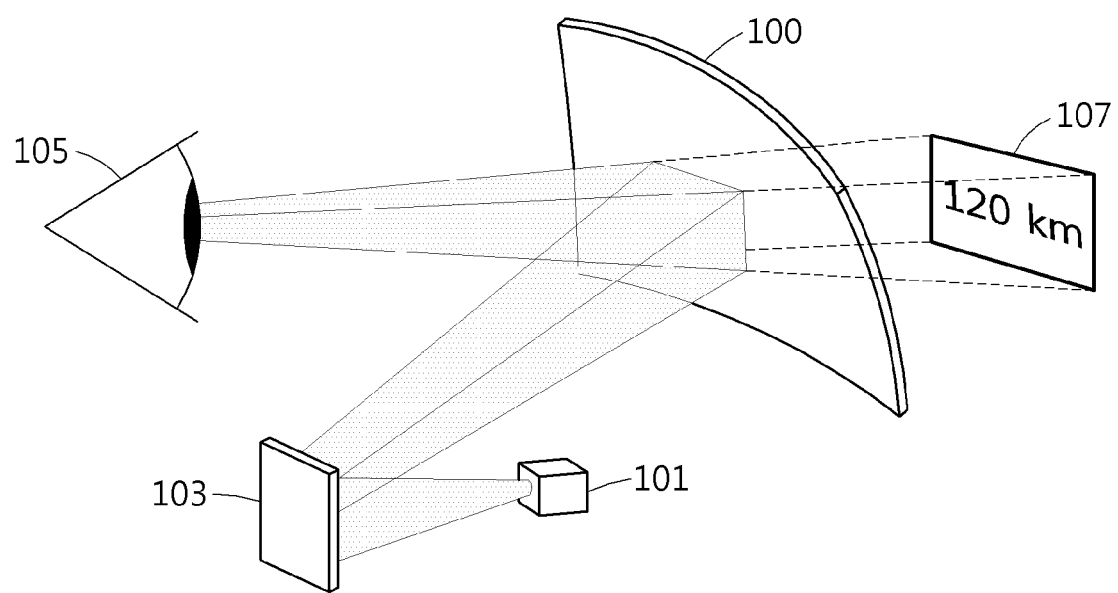
FIG. 1 illustrates an example of a process of transmitting an image to a user using a reflection system according to an example embodiment.

Reference will now be made in detail to example embodiments, examples of which are illustrated in the accompanying drawings, wherein like reference numerals refer to like elements throughout. Example embodiments are described below in order to explain the present disclosure by referring to the figures.

The following structural or functional descriptions are exemplary to merely describe the example embodiments, and the scope of the example embodiments is not limited to the descriptions provided in the present specification. Variations and modifications can be made thereto by those of ordinary skill in the art.

Although the terms "first" "second" may be used to explain various components, the components are not limited by the terms. These terms are used only to distinguish one component from another component. For example, a "first" component may be referred to as a "second" component, and similarly, the "second" component may be referred to as the "first" component within departing from the spirit and scope of example embodiments of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or combinations thereof.

Unless otherwise defined herein, all terms used herein including technical or scientific terms have the same meanings as those generally understood by one of ordinary skill in the art. Terms defined in general dictionaries should be construed as having meanings matching the contextual meanings in the related art and are not to be construed as having an ideal or excessively formal meaning unless otherwise defined herein.

It should also be noted that in some alternative implementations, the functions and operations described may occur out of the order illustrated in the figures. For example, two figures shown in succession may in fact be executed substantially concurrently or may sometimes be executed in the reverse order, depending upon the functions and operations involved.

Hereinafter, example embodiments will be described with reference to the accompanying drawings.

FIG. 1 illustrates an example of a process of transmitting an image to a user using a reflection system according to an example embodiment.

Augmented reality (AR) refers to technology that projects a virtual image in a real environment to make the virtual image appear as if it is present in the real environment. AR technology for vehicles provides information required for driving to a user (e.g., a driver) by projecting the information in a real environment. Using AR technology for vehicles, the driver may receive vehicle state information, traffic information, navigation information, or surrounding environment information. To enhance a sense of reality of an image provided from the AR technology for vehicles, a viewpoint of the provided image needs to match a viewpoint of the driver. Image processing technology for naturally matching the viewpoint of the provided image and a viewpoint of the driver and optical technology for effectively projecting a matched image are required. Such AR technology is an example of a field to which a head-up display (HUD) image providing apparatus applies. The HUD image providing apparatus is not limited thereto.

A HUD method may be used to naturally provide an AR image at a viewpoint of the user, for example, the driver without an obstacle. The HUD method may be implemented using a projection display apparatus (i.e., a projector). The projection display apparatus refers to a method of providing a HUD image by projecting the HUD image onto a screen. The projection display apparatus includes a display engine configured to provide HUD image information, a projection optical system, a magnifying optical system, and the screen onto which the HUD image is projected. The display engine includes a display, a processor configured to run the display, and a memory configured to store HUD image information. For example, the display may include an element, such as a vacuum fluorescent display (VFD), a cathode-ray tube (CRT), a liquid crystal display (LCD), and a light-emitting diode (LED). The screen may include a windshield or a combiner glass of a vehicle.

When an image of a HUD is projected onto the windshield, the image is reflected from the windshield and the driver may view driving information, for example, an image 107 as shown in FIG. 1. Here, an image reflected from an inner surface of the windshield and an image reflected from an outer surface of the windshield may be spatially separated due to a thickness of the windshield, which may result in a double image. In other words, the two reflections may appear as two images.

According to an example embodiment, a reflection system 100 may reduce a double image of the image 107 projected from the HUD. The reflection system 100 may adjust a path of light by changing a refractive index by changing a state of liquid crystal inside the reflection system 100. The reflection system 100 may remove the double image by adjusting the path of light and may provide a more precise image to a user 105 (i.e., a driver) that does not include a double image.

Referring to FIG. 1, the optical system may include a display apparatus 101, a reflector 103, and the reflection system 100. The reflector 103 may be modified or omitted depending on the structure of the optical system. The display apparatus 101 may project an image onto the reflector 103. The reflector 103 may reflect the image projected from the display apparatus 101 toward the reflection system 100.

The reflection system 100 may reflect the image reflected from the reflector 103 toward the user 105. The user 105 may recognize a virtual image, for example, the image 107, from the reflected image. The virtual image may be referred to as an imaginary image and refers to an image appearing as if the image is present at a position recognized by the user 105. The apparent position of the virtual image may be different from the position of the reflection system 100 or may be the same as that of the reflection system 100.

The reflection system 100 may include a liquid crystal layer between the inner surface and the outer surface of the windshield. In response to a voltage applied to the liquid crystal layer, the arrangement of liquid crystal may vary and the refractive index of the reflection system 100 may vary accordingly.

An image reflected from the inner surface of the windshield of the reflection system 100 and an image reflected from the outer surface of the windshield of the reflection system 100 may be spatially separated due to the thickness of the windshield, which may result in a double image. The reflection system 100 may apply the voltage to the liquid crystal layer to change the refractive index and adjust a path of the light rays of the two separate images, such that the two images may appear as a single image.

When power is not applied, liquid crystal may maintain an initial state in a rubbing direction and the refractive index may not vary. The rubbing direction may be a horizontal direction. In the initial state, the liquid crystal maintains a normal white state. In this case, light rays reflected from a front surface of the windshield and light rays reflected from a rear surface of the windshield are reflected at the same angle and the user 105 recognizes a double image.

The reflection system 100 applies power to the liquid crystal layer. The reflection system 100 may apply a voltage pattern of a low voltage or a voltage pattern of a high voltage to one or more regions of the liquid crystal layer. Here, the low voltage may be referred to as a reference voltage.

Liquid crystal molecules around a region to which the low voltage is applied may maintain an initial state in the rubbing direction or be tilted at a relatively small angle. For example, an effective refractive index of liquid crystal in the initial state may be close to 0.02.

Liquid crystal molecules around a region to which the high voltage is applied may be tilted at a relatively great angle, and may be tilted at a maximum of 90 degrees. For example, the effective refractive index of liquid crystal around the region to which the high voltage is applied may be close to zero.

The application of the low voltage in a first region and the high voltage in a second region may cause an electric field of an intermediate voltage to be formed between the low voltage position and the high voltage position. Accordingly, liquid crystal molecules around the corresponding region may be tilted at an intermediate angle. For example, the effective refractive index of liquid crystal may have a value between zero and 0.02.

As described above, a refractive index continuously varying from the low voltage to the high voltage may appear in a region (i.e., a unit region) of the liquid crystal layer. The unit region of the liquid crystal layer may function as a microprism. For example, the unit region of the liquid crystal layer may form an angle of 0.005 to 0.05 milli-radian (mrad) as the microprism. A portion of incident light rays may be reflected from a front surface of the windshield. Light rays transmitted by the front surface of the windshield may be refracted in an interface of the microprism and reflected from the rear surface of the windshield at an angle of refraction greater than an original angle of incidence. The unit region of the liquid crystal layer may have a continuously varying refractive index and may therefore adjust a path of reflected light to remove a double image. As described, the reflection system 100 may achieve an effect of removing the double image similar to the windshield to which a wedge angle is applied and may also achieve an effect of adjusting the wedge angle by adjusting a voltage.

Figure 2A:
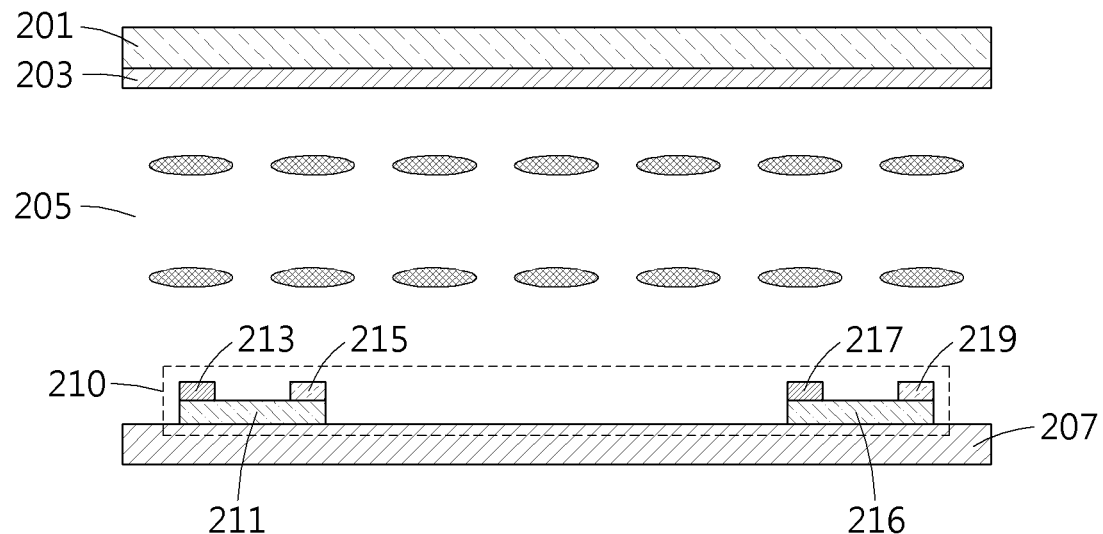
FIG. 2A illustrates an example of a state of liquid crystal when a reflection system is powered OFF according to an example embodiment.
Figure 2B:
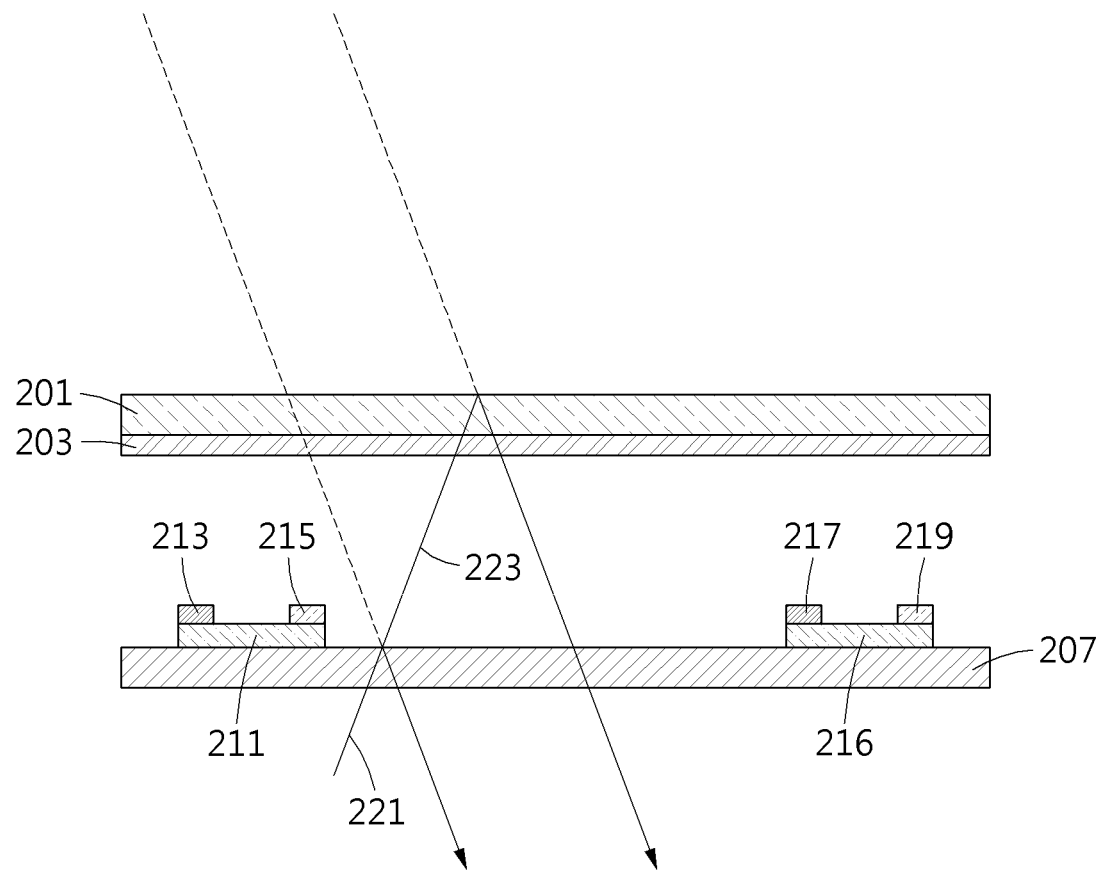
FIG. 2B illustrates an example of a path of light when a reflection system is powered OFF according to an example embodiment.

FIG. 2A illustrates an example of a state of liquid crystal when a reflection system is powered OFF according to an example embodiment, and FIG. 2B illustrates an example of a path of light when a reflection system is powered OFF according to an example embodiment.

According to an example embodiment, the reflection system, for example, the reflection system 100 of FIG. 1, may include a feeder and a windshield. Referring to FIGS. 2A and 2B, the windshield includes an upper transparent layer 201, an upper electrode 203, a liquid crystal layer 205, a lower electrode array 210, and a lower transparent layer 207. Here, the upper electrode 203 and the lower electrode array 210 may be transparent. The upper electrode 203 may be a single planar electrode. The lower electrode array 210 may include electrodes capable of adjusting the voltages that they apply according to a control signal.

The lower electrode array 210 may include a plurality of lower electrode cells 211 and 216. The lower electrode cells 211 and 216 may be regularly arranged. Each of the lower electrode cells 211 and 216 may include at least one lower electrode. For example, the lower electrode cell 211 may include a first lower electrode 213 and a second lower electrode 215, and the lower electrode cell 216 may include a first lower electrode 217 and a second lower electrode 219.

FIG. 2A is a cross-sectional view of a unit region of the liquid crystal layer 205 that extends between two lower electrode cells 211 and 216. Also, FIG. 2A illustrates an example of a state of liquid crystal when power is not applied. Referring to FIG. 2A, when the power is not applied, that is, OFF, the liquid crystal maintains an initial state in a horizontal direction and a refractive index maintains an initial value. The liquid crystal is regularly arranged in the horizontal direction and maintains a normal white state.

Referring to FIG. 2B, light ray 221 may be incident to the reflection system. A portion of the light ray 221 may be reflected from a surface of the lower transparent layer 207.

Another portion of the light ray 221 that is not reflected from the interface of the lower transparent layer 207 may pass through the lower transparent layer 207.

Light ray 223 that has passed through the lower transparent layer 207 may pass through the liquid crystal layer 205 and may be reflected from a surface of the upper transparent layer 201. The reflected light may again pass through the lower transparent layer 207. In a state in which the power is not applied, the liquid crystal layer 205 may maintain the initial state in which the liquid crystal is regularly arranged. In the initial state, a refractive index of the liquid crystal layer 205 does not vary. The refractive index of the liquid crystal layer 205 may be constant. Accordingly, a light ray reflected from the surface of the upper transparent layer 201 that passes through the transparent layer 207 may be in parallel with a light ray that is reflected from the lower transparent layer 207. Since a single light ray 221 is reflected as two light rays and reaches a user as two light rays, the user recognizes a double image.

Figure 3A:
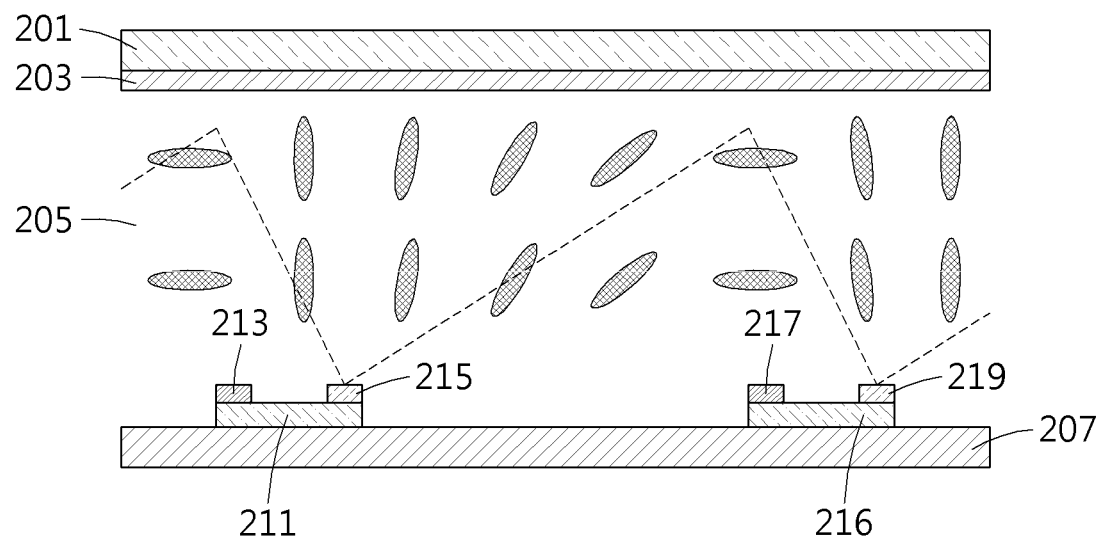
FIG. 3A illustrates an example of a state of liquid crystal for removing a double image when a reflection system is powered ON according to an example embodiment.
Figure 3B:
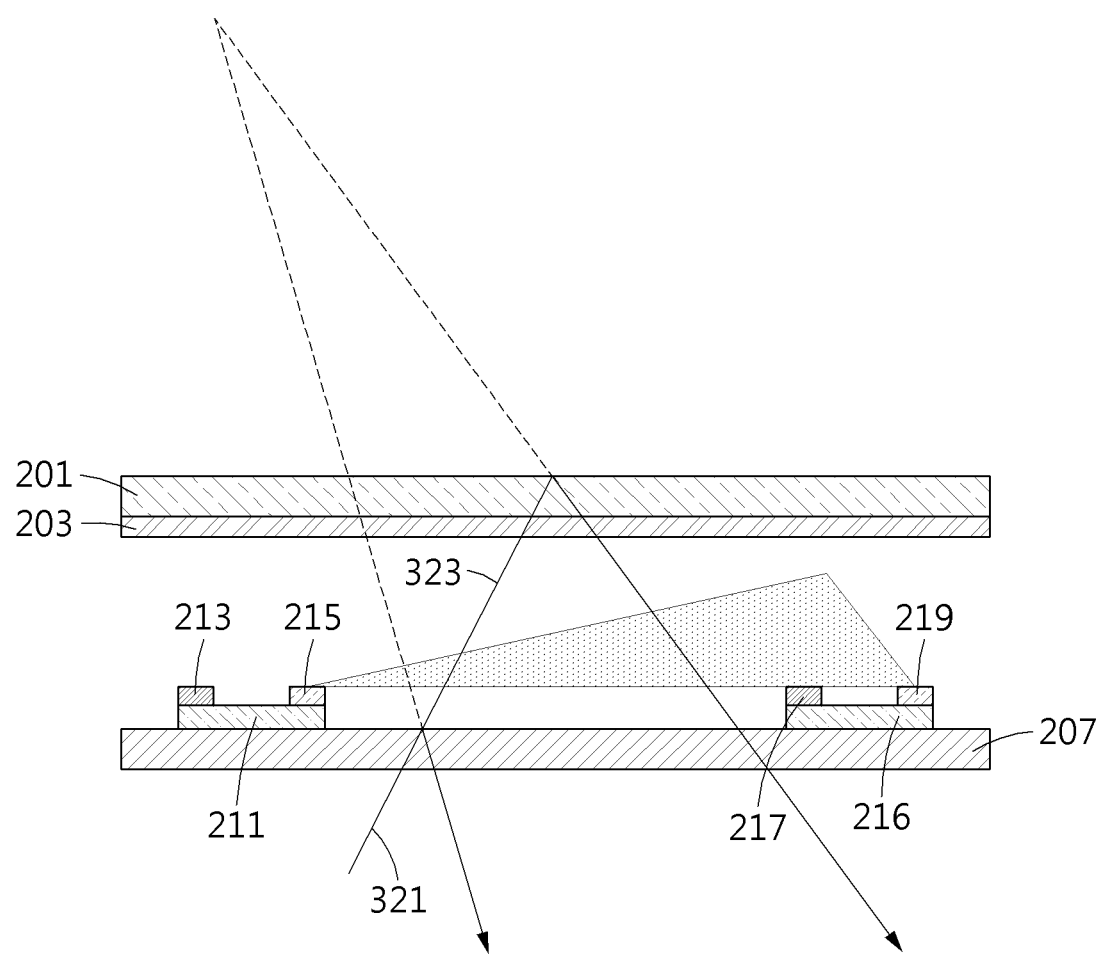
FIG. 3B illustrates an example of a path of light when a reflection system is powered ON according to an example embodiment.

FIG. 3A illustrates an example of a state of liquid crystal for removing a double image when a reflection system is powered ON according to an example embodiment, and FIG. 3B illustrates an example of a path of light when a reflection system is powered ON according to an example embodiment.

FIG. 3A is a cross-sectional view of a unit region of the liquid crystal layer 205 that extends between two lower electrode cells 211 and 216. FIG. 3A illustrates a state of the liquid crystal when power is applied. When the power is applied, that is, ON, a state of the liquid crystal varies from an initial state in a horizontal direction and a refractive index varies accordingly. The liquid crystal does not maintain regular arrangement in the horizontal direction and the refractive index varies continuously in the horizontal direction. In this fashion, the liquid crystal may form a continuous arrangement of microprisms wherein each unit region may be a single microprism.

The lower electrode cells 211 and 216 may be regularly arranged. The lower electrode cells 211 and 216 may be provided at a desired interval. Each of the lower electrode cells 211 and 216 may include at least one lower electrode. For example, the lower electrode cell 211 may include the first lower electrode 213 and the second lower electrode 215, and the lower electrode cell 216 may include the first lower electrode 217 and the second lower electrode 219.

The liquid crystal is in an intermediate state between solid and liquid. A progress direction of light may be adjusted through a process of regularly arranging liquid crystal that is an organic molecule having fluidity similar to that of a liquid. A liquid crystal molecule generally has an elongated shape and thus, has a birefringence (i.e., double refraction) characteristic. Here, the birefringence indicates that the refractive index varies based on a direction in which light is incident and at least one refractive index is present. An arrangement state of the liquid crystal may vary based on an applied voltage. In other words, a liquid crystal molecule may rotate from its initial direction when a voltage is applied. A rotation angle of the liquid crystal may increase as a higher voltage is applied compared to a reference voltage, that is, a low voltage.

The feeder may apply a preset voltage pattern to a lower electrode array. Here, the preset voltage pattern may be a first voltage pattern. The first voltage pattern may indicate a voltage pattern set to remove a double image. For example, the feeder may apply the low voltage, that is, the reference voltage to the first lower electrodes 213 and 217, and may apply the high voltage to the second lower electrodes 215 and 219.

A state of liquid crystal molecules adjacent to the second lower electrodes 215 and 219 to which the high voltage is applied may significantly change from an initial state due to the high voltage. For example, when the initial state is a horizontal state, the liquid crystal molecules to which the high voltage is applied may change from the horizontal state to a vertical state.

A state of liquid crystal molecules adjacent to the first lower electrodes 213 and 217 to which the low voltage is applied may maintain the initial state due to the low voltage. For example, when the initial state is a horizontal state, the liquid crystal molecules to which the low voltage is applied may maintain the horizontal state.

A state of liquid crystal molecules between the second lower electrode 215 and the first lower electrode 217 may be an intermediate state between the state of liquid crystal molecules to which the high voltage is applied and the state of liquid crystal molecules to which the low voltage is applied. For example, a gradient of liquid crystal molecules between the second lower electrode 215 and the first lower electrode 217 may continuously vary. The refractive index may thus continuously vary with the gradient based on the birefringence characteristic of the liquid crystal molecules. Accordingly, the liquid crystal molecules between the second lower electrode 215 and the first lower electrode 217 may form a microprism.

A change in the state of liquid crystal molecules may occur over the entire lower electrode array. A refractive index of the liquid crystal layer 205 may continuously vary for each of regions corresponding to a plurality of lower electrode cells included in the lower electrode array. A microprism may be formed on each of the regions of the liquid crystal layer 205 corresponding to the plurality of lower electrode cells.

The lower electrode array may include the first lower electrode cell 211 and the second lower electrode cell 216 adjacent to the first lower electrode cell 211. When the feeder applies a first voltage pattern to the first lower electrode cell 211 and the second lower electrode cell 216, a refractive index of each of regions of the liquid crystal layer 205 corresponding to the first lower electrode cell 211 and the second lower electrode cell 216 may vary.

When the feeder applies the first voltage pattern to the lower electrode array, the refractive index of the liquid crystal layer 205 may vary. Due to the varying refractive index, as shown in FIG. 3B, two light rays that are incident to the windshield in parallel and reflected respectively from the upper transparent layer 201 and the lower transparent layer 207 may meet at a virtual focus (i.e., focal point).

A light ray 321 may be incident to the reflection system. A portion of the light ray 321 may be reflected from a surface of the lower transparent layer 207. Another portion, for example, a light ray 323, of the light ray 321 that is not reflected from the surface of the lower transparent layer 207 may pass through the lower transparent layer 207.

The light ray 323 that passes through the lower transparent layer 207 may pass through the liquid crystal layer 205 and may be reflected from a surface of the upper transparent layer 201. The reflected light may again pass through the lower transparent layer 207. A microprism may be formed inside the liquid crystal layer 205. Thus, the refractive index of the liquid crystal layer 205 may continuously vary in a region between the second lower electrode 215 and the first lower electrode 217. Accordingly, the light ray that passes through the lower transparent layer 207 again may be refracted by the liquid crystal layer 205 and therefore may not be parallel to a light ray reflected from the lower transparent layer 207 and progress paths of the two light ray may meet at the virtual focus. Since the reflected two light rays meet at a single virtual focus, the user does not recognize a double image.

Figure 4A:
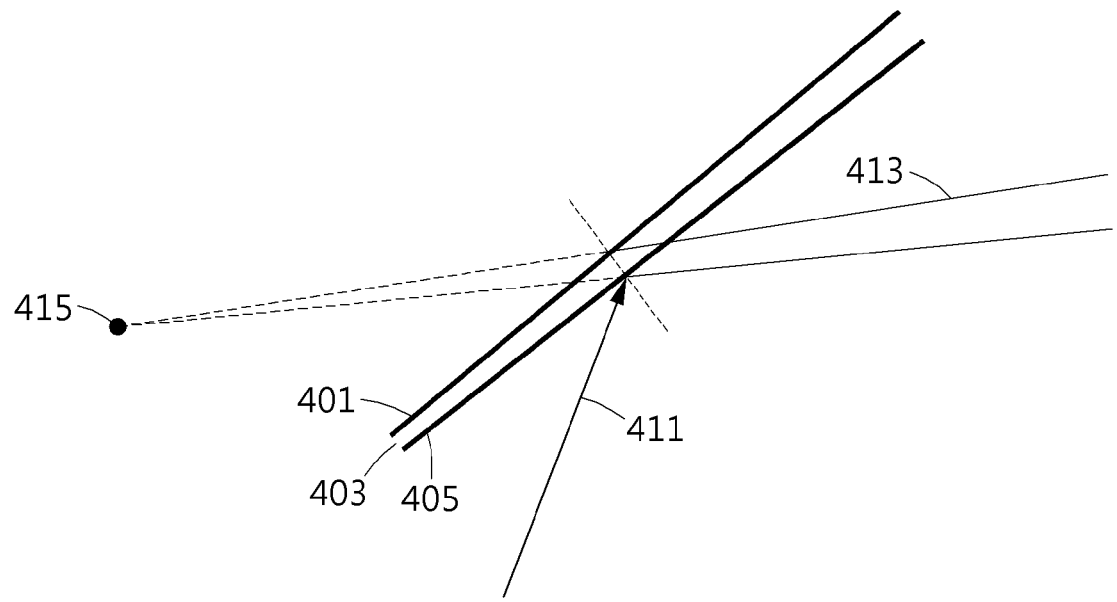
FIG. 4A illustrates an example of a path of light in a reflection system having a wedge angle according to an example embodiment.
Figure 4B:
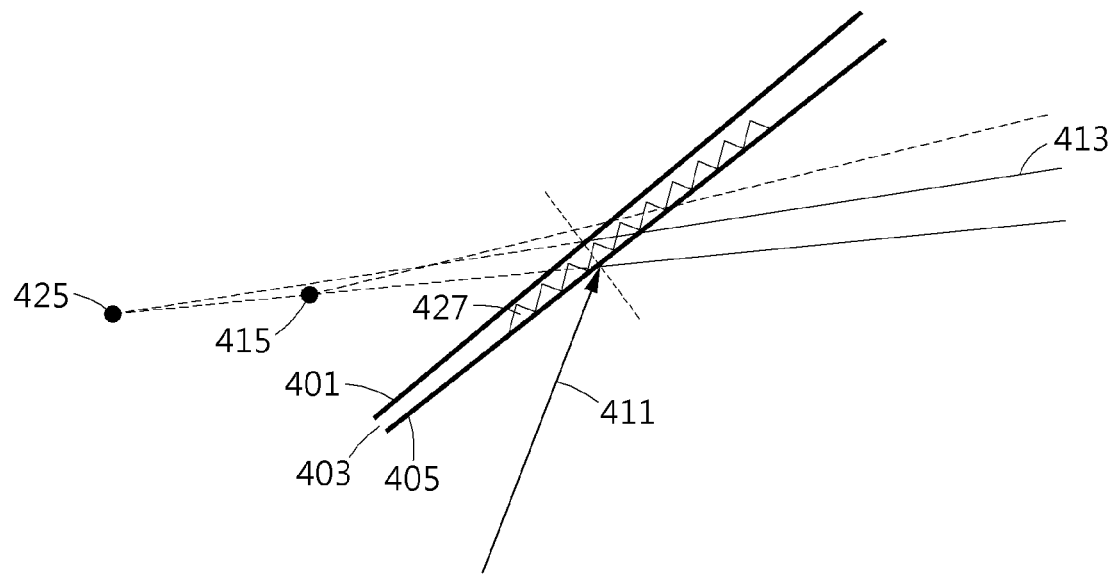
FIG. 4B illustrates another example of a path of light when a reflection system is powered ON according to an example embodiment.

FIG. 4A illustrates an example of a path of light in a reflection system having a wedge angle according to an example embodiment, and FIG. 4B illustrates another example of a path of light when a reflection system is powered ON according to an example embodiment.

An image reflected from an inner surface of a windshield and an image reflected from an outer surface of the windshield may be spatially separated due to a thickness of the windshield, which may result in a double image appearing as two images. Accordingly, the windshield may be manufactured in a wedge form such that the image reflected from the inner surface of the windshield and the image reflected from the outer surface of the windshield may be angled with respect to one another so as not to result in a double image.

Referring to FIG. 4A, an upper transparent window 401 and a lower transparent window 405 that constitute the windshield may form a wedge angle. The upper transparent window 401 and the lower transparent window 405 may be tilted with respect to one another at the wedge angle. The wedge angle may be 0.1 to 0.7 mrad. Here, the wedge angle may need to be different for each vehicle since, for example, an angle at which the windshield is tilted, a thickness of the windshield, and a field of view (FOV) differ for each vehicle.

According to an example embodiment, the reflection system may implement or otherwise function as a reverse wedge angle that compensates for the wedge angle using a liquid crystal layer 403. To this end, the reflection system may include a feeder and the windshield. The windshield may include the upper transparent layer 401, an upper electrode, the liquid crystal layer 403, a lower electrode array, and the lower transparent layer 405. The upper transparent layer 401 and the lower transparent layer 405 may form the wedge angle. An angle between the upper transparent layer 401 and the lower transparent layer 405 may be the wedge angle.

When power is not applied to the liquid crystal layer 403, paths of two light rays 411 and 413 that are incident to the windshield in parallel and reflected from the upper transparent layer 401 and the lower transparent layer 405 may meet at a first virtual focus 415. Due to the wedge angle formed by the upper transparent layer 401 and the lower transparent layer 405, paths of the reflected two lights 411 and 413 may not be in parallel and may meet at the first virtual focus 415.

Referring to FIG. 4B, when the feeder applies the first voltage pattern to the lower electrode array, a refractive index of the liquid crystal layer 403 may vary. Due to the varied refractive index, paths of the two light rays 411 and 413 that are incident to the windshield in parallel and reflected from the upper transparent layer and the lower transparent layer, respectively, may meet at a second virtual focus 425 instead of the first virtual focus 415.

The refractive index of the liquid crystal layer 403 may continuously vary for each of regions corresponding to a plurality of lower electrode cells included in the lower electrode array. A microprism may be formed for each of the regions of the liquid crystal layer 403 corresponding to the plurality of lower electrode cells.

The lower electrode array may include a first lower electrode cell and a second lower electrode cell adjacent to the first lower electrode cell. When the feeder applies the first voltage pattern to the first lower electrode cell and the second lower electrode cell, a refractive index of each of regions of the liquid crystal layer 403 corresponding to the first lower electrode cell and the second lower electrode cell may vary.

Each of the first and second lower electrode cells included in the lower electrode array may include the first lower electrode and the second lower electrode. A low voltage may be applied to the first lower electrode of each of the first and second lower electrode cells, and a high voltage may be applied to the second lower electrode of each of the second lower electrode cells.

Although the second virtual focus 425 is illustrated to be farther away from the windshield compared to the first virtual focus 415, the second virtual focus 425 may be adjusted to be closer to the windshield compared to the first virtual focus 415. A position of a focus to be formed may be adjusted based on a voltage pattern to be applied. FIG. 4B is provided as an example.

Figure 5A:
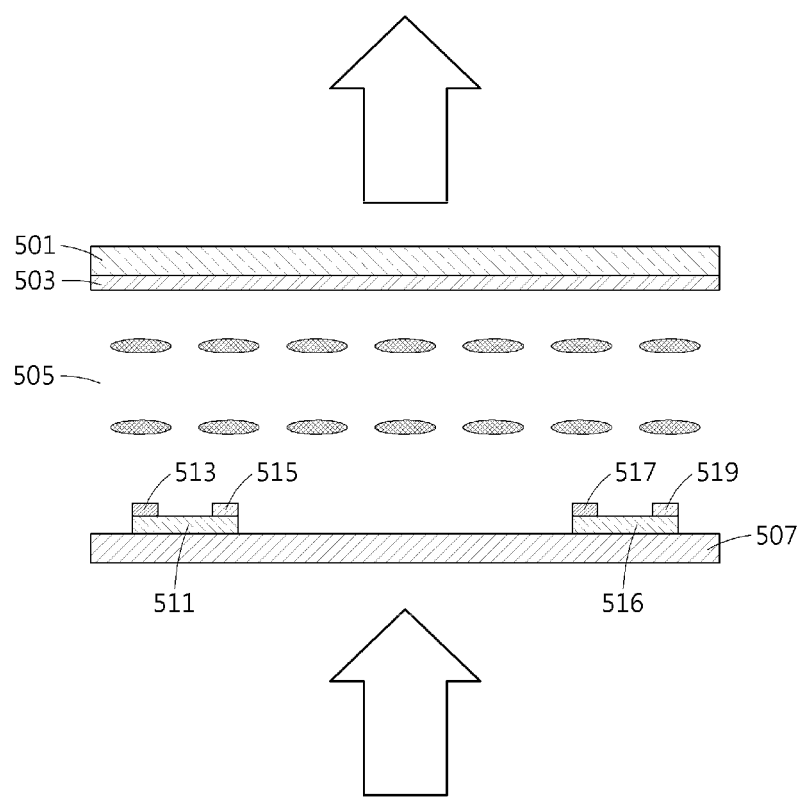
FIG. 5A illustrates an example of a state of liquid crystal when a reflection system is powered OFF according to an example embodiment.
Figure 5B:
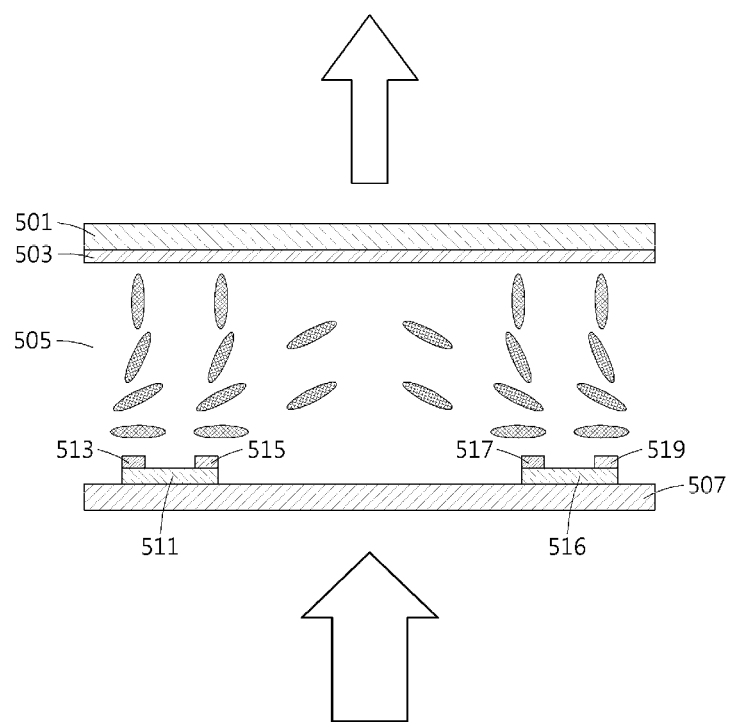
FIG. 5B illustrates an example of a state of liquid crystal for changing a transmittance when a reflection system is powered ON according to an example embodiment.

FIG. 5A illustrates an example of a state of liquid crystal when a reflection system is powered OFF according to an example embodiment; and FIG. 5B illustrates an example of a state of liquid crystal for changing a transmittance when a reflection system is powered ON according to an example embodiment.

According to an example embodiment, the reflection system may include a feeder and a windshield. The windshield includes an upper transparent layer 501, an upper electrode 503, a liquid crystal layer 505, a lower electrode array, and a lower transparent layer 507. Here, the upper electrode 503 and the lower electrode array may be transparent. The upper electrode 503 may be a single planar electrode. The lower electrode array may be an electrode capable of adjusting a voltage to be applied.

The lower electrode array may include a plurality of lower electrode cells 511 and 516. The lower electrode cells 511 and 516 may be regularly arranged. Each of the lower electrode cells 511 and 516 may include at least one lower electrode. For example, the lower electrode cell 511 may include a first lower electrode 513 and a second lower electrode 515, and the lower electrode cell 516 may include a first lower electrode 517 and a second lower electrode 519.

FIG. 5A is a cross-sectional view of a unit region of the liquid crystal layer 505 that extends between two lower electrode cells 511 and 516 when the power is OFF. FIG. 5A illustrates an example of a state of liquid crystal when power is not applied. Referring to FIG. 5A, when the power is not applied, that is, OFF, the liquid crystal maintains an initial state in a horizontal direction and liquid crystal molecules are regularly arranged in the horizontal direction.

When a predetermined (or, alternatively, desired) quantity of light is incident to the lower transparent layer 507, the light passes through the liquid crystal layer 505 and then passes through the upper transparent layer 501. Here, since the liquid crystal molecules maintain the initial state, the light may mostly pass through the upper transparent layer 501 and be emitted.

FIG. 5B is a cross-sectional view of a unit region of the liquid crystal layer 505 that extends between two lower electrode cells 511 and 516 when the power is ON. When the feeder applies a second voltage pattern to the lower electrode array, the refractive index of the liquid crystal layer 505 may vary. For example, when the feeder applies the second voltage pattern to the lower electrode array, the refractive index of the liquid crystal layer 505 may vary. Here, the second voltage pattern may include a voltage that causes liquid crystal molecules to be irregularly arranged. In other words, the second voltage pattern may cause the refractive index of the liquid crystal layer 505 to vary in a non-continuous manner.

For example, when the same voltage is applied to the first lower electrodes 513 and 517 and the second lower electrodes 515 and 519, the liquid crystal molecules may be rearranged in the same direction. When the power is OFF as shown in FIG. 5A, all of the light rays may pass. When a voltage is applied to the first lower electrodes 513 and 517 that is different from a voltage applied to the second lower electrodes 515 and 519, the liquid crystal molecules may be rearranged and the quantity of the transmitted light may decrease. As described above, the reflection system may be used as a film that adjusts a transmittance in the windshield.

The example embodiments described herein may be implemented using hardware components, software components, and/or a combination thereof. For example, the apparatuses, methods, processing device, and components described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording media.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A reflection system comprising:
a windshield comprising an upper transparent layer, an upper electrode, a liquid crystal layer, a lower electrode array, and a lower transparent layer; and
a feeder configured to apply a voltage pattern to the lower electrode array,
wherein a refractive index of the liquid crystal layer varies across the liquid crystal layer according to the voltage pattern applied by the feeder to the lower electrode array, and
wherein the feeder is configured to apply a first voltage pattern to cause a first change in the refractive index of the liquid crystal layer such that a first portion of a light ray is passed through the lower transparent layer and is reflected from the upper transparent layer at a first angle and a second portion of the light ray is reflected from the lower transparent layer at a second angle to meet the first portion at a virtual focal point,
wherein the lower electrode array comprises a first lower electrode cell and a second lower electrode cell, and the refractive index of the liquid crystal layer varies in a region between the first lower electrode cell and the second lower electrode cell.

2. The reflection system of claim 1, wherein the liquid crystal layer comprises a plurality of regions, each region from among the plurality of regions corresponding to a plurality of lower electrode cells, and
wherein the first voltage pattern applied by the feeder causes a refractive index of each region from among the plurality of regions to continuously vary across the region.

3. The reflection system of claim 2, wherein each region from among the plurality of regions having the first voltage pattern applied by the feeder comprises a microprism.

4. The reflection system of claim 1, wherein the second lower electrode cell is adjacent to the first lower electrode cell,
wherein the liquid crystal layer comprises a first region corresponding to the first lower electrode cell and a second region corresponding to the second lower electrode cell, and
wherein a first refractive index of the first region and a second refractive index of the second region continuously vary in response to the feeder applying the first voltage pattern to the first lower electrode cell and the second lower electrode cell.

5. The reflection system of claim 4, wherein the first lower electrode cell comprises a first lower electrode and a second lower electrode,
wherein the second lower electrode cell comprises a third lower electrode and a fourth lower electrode,
wherein a low voltage is applied to the first lower electrode of the first lower electrode cell and the third lower electrode of the second lower electrode cell, and
wherein a high voltage is applied to the second lower electrode of the first lower electrode cell and the fourth lower electrode of the second lower electrode cell.

6. The reflection system of claim 1, wherein the feeder is configured to apply a second voltage pattern to cause a second change in the refractive index of the liquid crystal layer such that a transmittance of the windshield decreases.

7. A reflection system comprising:
a windshield comprising an upper transparent layer, an upper electrode, a liquid crystal layer, a lower electrode array, and a lower transparent layer; and
a feeder configured to apply a voltage pattern to the lower electrode array,
wherein the upper transparent layer and the lower transparent layer form a wedge angle,
wherein a refractive index of the liquid crystal layer varies across the liquid crystal layer according to the voltage pattern applied by the feeder to the lower electrode array,
wherein, in response to the feeder not applying any voltage pattern, a first portion of a light ray is passed through the lower transparent layer and reflected from the upper transparent layer at a first angle and a second portion of the light ray is reflected from the lower transparent layer at a second angle to meet the first portion at a first virtual focal point, and
wherein, in response to the feeder applying a first voltage pattern, the first portion of the light ray is passed through the lower transparent layer and reflected from the upper transparent layer at a third angle different from the first angle and the second portion of the light ray is reflected from the lower transparent layer at the second angle to meet the first portion at a second virtual focal point,
wherein the lower electrode array comprises a first lower electrode cell and a second lower electrode cell, and the refractive index of the liquid crystal layer varies in a region between the first lower electrode cell and the second lower electrode cell.

8. The reflection system of claim 7, wherein the liquid crystal layer comprises a plurality of regions, each region from among the plurality of regions corresponding to a plurality of lower electrode cells, and
wherein the first voltage pattern applied by the feeder causes a refractive index of each region from among the plurality of regions to continuously vary across the region.

9. The reflection system of claim 8, wherein each region from among the plurality of regions having the first voltage pattern applied by the feeder comprises a microprism.

10. The reflection system of claim 7, wherein the second lower electrode cell is adjacent to the first lower electrode cell,
wherein the liquid crystal layer comprises a first region corresponding to the first lower electrode cell and a second region corresponding to the second lower electrode cell, and
wherein a first refractive index of the first region and a second refractive index of the second region change in response to the feeder applying the first voltage pattern to the first lower electrode cell and the second lower electrode cell.

11. The reflection system of claim 10, wherein the first lower electrode cell comprises a first lower electrode and a second lower electrode,
wherein the second lower electrode cell comprises a third lower electrode and a fourth lower electrode,
wherein a low voltage is applied to the first lower electrode of the first lower electrode cell and the third lower electrode of the second lower electrode cell, and
wherein a high voltage is applied to the second lower electrode of the first lower electrode cell and the fourth lower electrode of the second lower electrode cell.

12. The reflection system of claim 7, wherein the feeder is configured to apply a second voltage pattern to cause a second change in the refractive index of the liquid crystal layer such that a transmittance of the windshield decreases.

* * * * *